(12) United States Patent
Martin et al.

(10) Patent No.: US 10,493,518 B2
(45) Date of Patent: Dec. 3, 2019

(54) SHEAVE KNURLING TOOL AND METHOD OF OPERATING

(71) Applicant: OTIS ELEVATOR COMPANY, Farmington, CT (US)

(72) Inventors: Kyle B. Martin, Avon, CT (US); David J. Lanesey, Harwinton, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 558 days.

(21) Appl. No.: 15/251,781

(22) Filed: Aug. 30, 2016

(65) Prior Publication Data

US 2018/0056368 A1 Mar. 1, 2018

(51) Int. Cl.
| | |
|---|---|
| *B23P 6/00* | (2006.01) |
| *B23P 9/02* | (2006.01) |
| *B21H 7/14* | (2006.01) |
| *F16H 55/38* | (2006.01) |
| *B66B 15/04* | (2006.01) |

(52) U.S. Cl.
CPC .................. *B21H 7/14* (2013.01); *B23P 6/00* (2013.01); *B23P 9/02* (2013.01); *B66B 15/04* (2013.01); *F16H 55/38* (2013.01)

(58) Field of Classification Search
CPC ...... B23P 6/00; B23P 9/00; B23P 9/02; B23P 9/04; Y10S 72/703; B23B 27/24; B21D 17/04
USPC .................................................... 72/112, 703
See application file for complete search history.

(56) References Cited

U.S. PATENT DOCUMENTS

| | | | | |
|---|---|---|---|---|
| 2,294,685 | A * | 9/1942 | Nelson .................... | B23B 27/24 72/703 |
| 2,546,058 | A * | 3/1951 | Boulet .................... | B23B 27/24 72/703 |
| 2,590,667 | A * | 3/1952 | Wittman .................. | B21H 7/14 72/703 |
| 2,870,662 | A * | 1/1959 | Poorman ................. | B23B 27/24 72/703 |

(Continued)

FOREIGN PATENT DOCUMENTS

| | | |
|---|---|---|
| CH | 565002 A5 | 8/1975 |
| CN | 101157193 A | 4/2008 |

(Continued)

OTHER PUBLICATIONS

"On Site Regrooving of Sheaves" Lift Repairs—Sheaves. Retrieved from the Internet Nov. 9, 2016. URL: <http://www.dcleng.com.au/index.php?f=lift-repair> 3 pages.

(Continued)

*Primary Examiner* — Teresa M Ekiert
(74) *Attorney, Agent, or Firm* — Cantor Colburn LLP

(57) ABSTRACT

A sheave knurling tool is adapted to knurl a sheave while carrying a belt and coupled to a drive unit for rotation. The sheave knurling tool may include a body, an arm, a jack, and a knurling wheel. The body is detachably coupled to a support structure of the drive unit. The arm is pivotally engaged to the body about a pivot axis. The jack is adjustably coupled to, and extends between, the body and the arm. The knurling wheel is carried by the arm, and the jack is constructed and arranged to pivot the arm toward the sheave thereby exerting a biasing force of the knurling wheel against the sheave.

10 Claims, 6 Drawing Sheets

(56) References Cited

U.S. PATENT DOCUMENTS

| | | | | |
|---|---|---|---|---|
| 3,991,599 A | * | 11/1976 | Rowley | B21D 17/04 |
| | | | | 72/121 |
| 5,046,226 A | * | 9/1991 | Che | B23B 27/24 |
| | | | | 72/703 |
| 5,528,919 A | * | 6/1996 | McGrady | B21D 17/04 |
| | | | | 72/105 |
| 7,461,721 B2 | | 12/2008 | Aulanko et al. | |
| 8,863,906 B2 | | 10/2014 | Mustalahti et al. | |
| 2011/0259676 A1 | | 10/2011 | Nardi et al. | |
| 2011/0318497 A1 | | 12/2011 | Beals et al. | |

FOREIGN PATENT DOCUMENTS

| | | |
|---|---|---|
| CN | 102266947 A | 12/2011 |
| CN | 103241046 A | 8/2013 |
| CN | 104229579 A | 12/2014 |
| CN | 105084166 A | 11/2015 |
| EP | 1754560 A1 | 2/2007 |
| JP | S57138501 A | 8/1982 |
| JP | S6165703 A | 4/1986 |
| JP | S6190802 A | 5/1986 |
| JP | H09290984 A | 11/1997 |
| JP | 2002172449 A | 6/2002 |
| JP | 4844183 B2 | 12/2011 |
| JP | 4979617 B2 | 7/2012 |
| JP | 5762264 B2 | 8/2015 |

OTHER PUBLICATIONS

European Search Report for application No. 17188128.7-1017 dated Jan. 31, 2018, 6 pages.

* cited by examiner

SHEAVE KNURLING TOOL AND METHOD OF OPERATING

BACKGROUND

The present disclosure relates to a sheave knurling tool, and more particularly, to a method of reconditioning belt sheave surfaces and utilization of the tool.

Rotating sheaves are known to guide and assist the movement of belts that ride upon outer, generally cylindrical, surfaces of the sheave. In some sheave applications, slippage between the sheave and the belt may be of little or no concern. In other applications, slippage between the belt and sheave may cause unwanted consequences pertaining to other weight bearing components that may be coupled to the moving belt. In some applications, the belts may be cogged and mate with a cogged surface of the sheave, in other applications a friction increasing surface may be added to the sheave surface. One such friction inducing technique may be achieved via sand blasting or texturing of the surface. Unfortunately, some belt sheave applications may not be conducive toward cogged belts, while other applications may have a tendency to wear friction producing surfaces smooth over time, thus encouraging slippage. Yet further, replacement of worn-smooth sheaves in the field may be expensive, time consuming, and may require removal of the belt and removal of various components associated with the sheave. One non-limiting example of such a sheave is the machine driven sheave of an elevator system.

SUMMARY

A sheave knurling tool adapted to knurl a sheave while carrying a belt and while coupled to a drive unit for rotation, the sheave knurling tool according to one, non-limiting, embodiment includes a body detachably coupled to a support structure of the drive unit; an arm pivotally engaged to the body about a first pivot axis; a jack adjustably coupled to and extending between the body and the arm; and a first knurling wheel carried by the arm, and wherein the jack is constructed and arranged to pivot the arm toward the sheave thereby exerting a biasing force of the first knurling wheel against the sheave.

Additionally to the foregoing embodiment, the jack is pivotally engaged to the arm at a second pivot axis.

In the alternative or additionally thereto, in the foregoing embodiment, the jack is pivotally coupled to the body at a third pivot axis.

In the alternative or additionally thereto, in the foregoing embodiment, the jack includes a rod mounted for rotation to the body, and a threaded bore in the rod threadably receives a screw of the jack.

In the alternative or additionally thereto, in the foregoing embodiment, the first knurling wheel is carried by the arm between the first and second pivot axis.

In the alternative or additionally thereto, in the foregoing embodiment, the first knurling wheel is rotationally engaged to the arm about a rotational axis.

In the alternative or additionally thereto, in the foregoing embodiment, the sheave knurling tool includes a carrier pivotally engaged to the arm about a fourth pivot axis; and a second knurling wheel rotationally engaged to the carrier about second rotational axis, and wherein the first knurling wheel is rotationally engaged to the carrier about a first pivot axis spaced radially from the second pivot axis.

In the alternative or additionally thereto, in the foregoing embodiment, the first, second, third, and fourth pivot axes are substantially parallel to one-another.

In the alternative or additionally thereto, in the foregoing embodiment, the jack includes a rod mounted for rotation to the body and a threaded bore in the rod threadably receives a screw of the jack.

In the alternative or additionally thereto, in the foregoing embodiment, an end segment of the screw is operatively coupled to a first end portion of the arm, and the first pivot axis is located at an opposite second end portion of the arm.

In the alternative or additionally thereto, in the foregoing embodiment, the first knurling wheel is rotationally engage to the arm between the first and second end portions.

In the alternative or additionally thereto, in the foregoing embodiment, the sheave knurling tool includes a carrier pivotally engaged to the arm between the first and second end portions; and a second knurling wheel rotationally engaged to the carrier, and wherein the first knurling wheel is rotationally engaged to the carrier.

A method of operating a sheave knurling tool according to another, non-limiting, embodiment includes placing the sheave knurling tool between two belt segments draping down from a sheave; mounting a body to a support structure of a drive unit coupled to the sheave; actuating a jack to move an arm pivotally engaged to the body; and bearing a knurling wheel coupled to the arm against an exposed surface section of a circumferentially continuous surface of the sheave.

Additionally to the foregoing embodiment, the method includes rotationally driving the sheave to rotate the knurling wheel.

In the alternative or additionally thereto, in the foregoing embodiment, the sheave is driven by the drive unit.

In the alternative or additionally thereto, in the foregoing embodiment, the jack includes a screw adjustably engaged to the body with an end segment that bears upon the arm.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
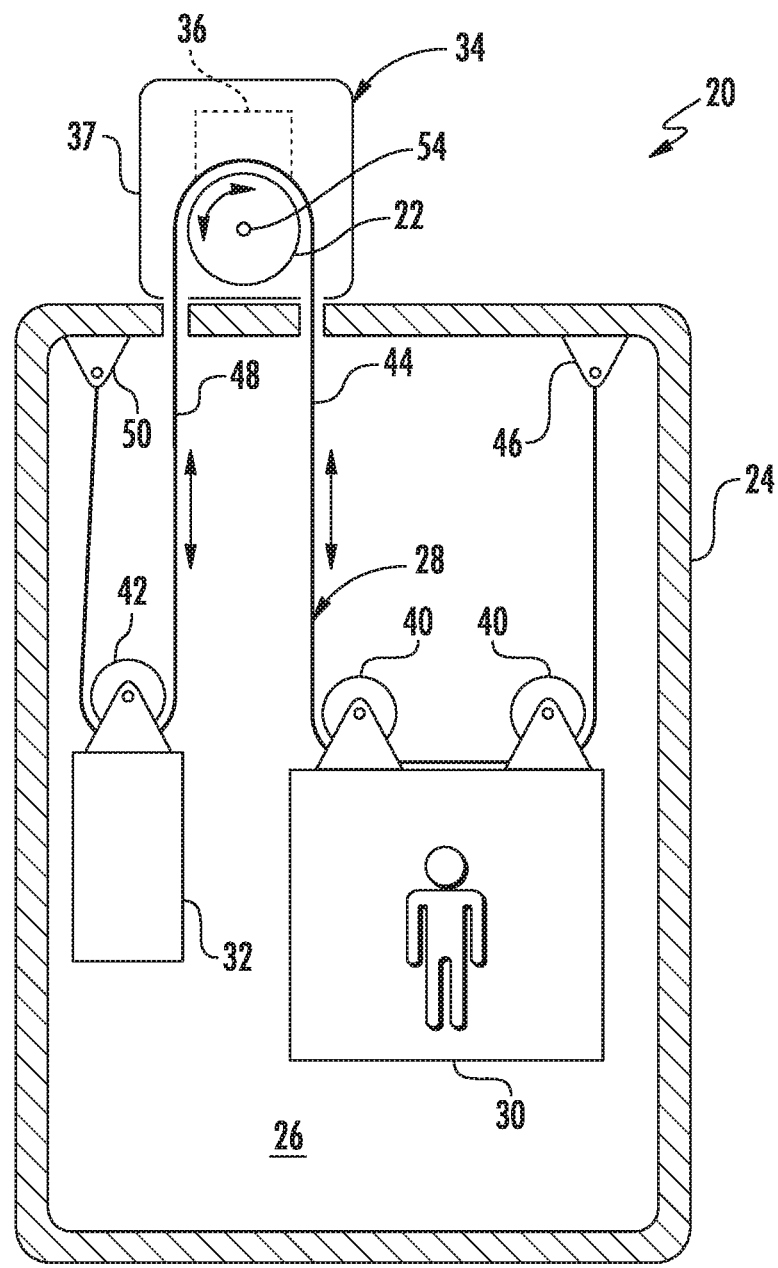
FIG. 1 is a schematic of an elevator system as one, non-limiting, application of a sheave presented as an exemplary embodiment of the present disclosure.

Referring to FIG. 1, an elevator system 20 is illustrated as one, non-limiting, application of a sheave 22 of the present disclosure that may be a drive sheave. The elevator system 20 may include a stationary structure or building 24 defining a hoistway 26, a belt 28, a car 30, a counterweight 32 and a drive unit 34. The car 30 may carry passengers or other objects and may be constructed to move substantially vertically in the hoistway 26. The drive unit 34 may be housed in a machine room (not shown) of the building 24 located generally above the hoistway 26, and may include an electric motor 36 that drives and is coupled for rotation to the sheave 22, and a motor support structure or motor housing 37 fixed to the stationary structure 24. In one example, the belt 28 is partially wrapped (e.g., substantially less than 360 degrees) about the sheave 22 and extends between the car 30 and the counterweight 32 such that the car and counterweight 32 may be suspended by the belt 28. In operation and when the drive unit 34 receives a command signal to raise the car 30, the sheave 22 rotates in a first direction that lowers the counterweight 32 as the car 30 rises, and vice-versa. The counterweight 32 may generally weigh about the same as the car 30 when at about fifty percent capacity, and thus reduces the work output requirements of the drive unit 34.

The elevator system 20 may further include at least one car sheave or pulley 40 (i.e., two illustrated) rotationally mounted to the elevator car 22, and a counterweight sheave or pulley 42 rotationally mounted to the counterweight 24. From the drive sheave 22 of the drive system 26, a car segment 44 of the belt 28 may generally extend in a downward direction, wrap about the car sheave(s) 40, and extend back upward to a structure termination 46. Similarly, and from an opposite side of the drive sheave 22, a counterweight segment 48 of the belt 28 may generally extend in a downward direction, wrap about the counterweight sheave 42, and extend back upward to a structure termination 50. Both structure terminations 46, 50 may be load bearing and may be secured to and supported by the stationary structure 24. Furthermore, the structure terminations 46, 50 may be dead end hitches as is generally known in the art.

The belt 28 may be any variety of flexible and elongated members and may include a series of small elevator straps coated with any variety of materials (e.g., polyurethane), and referred to as coated steel belts (CSB). It is contemplated and understood that the car belt segment 44 and the counterweight belt segment 48 may generally be separated at the drive sheave 22 with the car belt segment 44 wrapping about the drive sheave 22 in a first rotational direction, and the counterweight belt segment 48 wrapping about the drive sheave 38 in an opposite rotational direction. It is further understood that the belt segments 44, 48 may be other than car and counterweight segments and is dependent upon any number of non-limiting examples of sheave arrangements. For example, an elevator system may not have a counterweight, yet may still have two belt segments on either side of a motor driven sheave (e.g., 1:1 elevator roping scenario).

Figure 2:
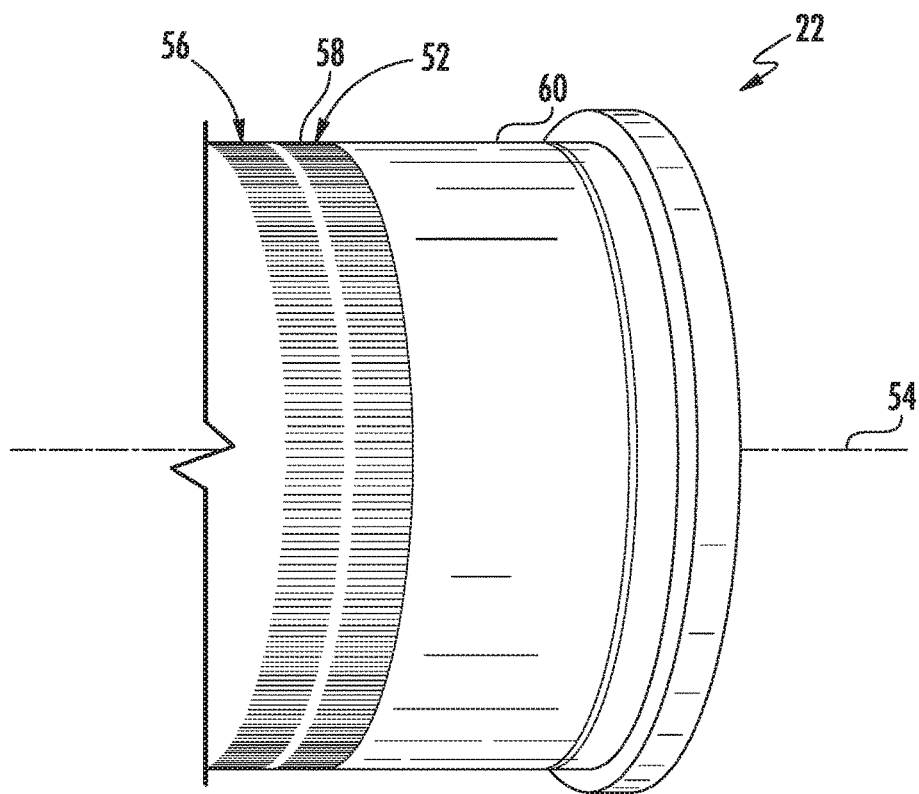
FIG. 2 is a side view of the sheave.
Figure 3:
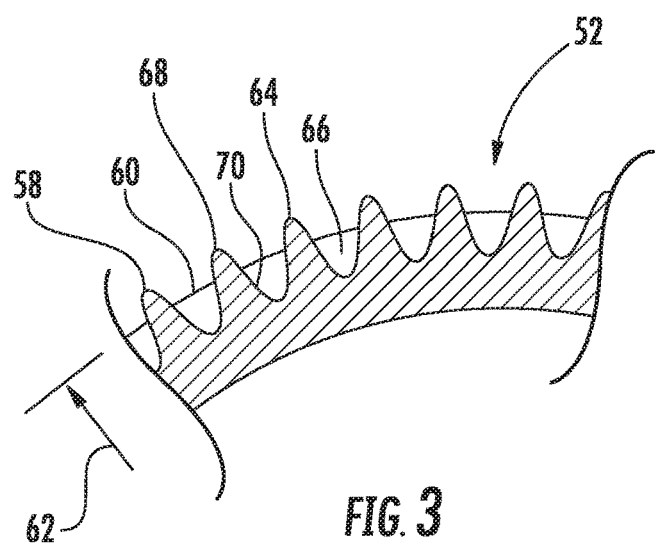
FIG. 3 is a partial cross section of the sheave illustrating imprints.

Referring to FIGS. 1 through 3, any one or more of the sheaves 22, 40, 42 may be metallic (e.g., chrome plated steel), and may include a plurality of imprints 52 that may be knurls to induce friction between the belt 28 and the imprinted sheave. In the present example, the drive sheave 22 may rotate about an axis 54, and may include a surface 56 that may be circumferentially continuous and substantially cylindrical, faces at least in-part radially outward, and is centered about axis 54. The entire surface 56 may be imprinted (i.e., is completely covered with the plurality of imprints 52), or may include a circumferentially continuous first portion 58 that carries the plurality of imprints 52, and an axially adjacent, cylindrical, and substantially smooth second portion 60 having a consistent diameter (see arrow 62 in FIG. 3). It is understood that the term 'substantially smooth' includes describing a surface that is polished smooth, and/or a surface that is, or resembles, a sand blasted or textured surface, but may not include a knurled surface. It is contemplated and understood that the substantially cylindrical surface 56 may include a slight spherical crown as is known by one skilled in the art of belt sheaves.

Referring to FIGS. 2 and 3, each one of the plurality of imprints 52 may include a member 64 that may be disposed radially outward from the second portion 60 of the surface 56. Each member 64 may be spaced from the next adjacent member by a valley or cavity 66 having boundaries defined by the surface portion 58, and disposed radially inward from the second portion 60. In the illustrated example, the members 64 may be axially extending ribs spaced circumferentially from the next adjacent rib by a valley 66. More specifically, each rib 64 may carry a convex face 68 that generally extends circumferentially and congruently joins into a concave face 70 that generally defines the boundaries of the valleys 66. It is contemplated and understood that the imprints 52 and/or members 64 may be any variety of configurations capable of producing friction and limiting or preventing belt slip between the belt 28 and sheave 22. In alternative examples, the members 64 may be diamond-shaped, a helix of straight ridges, dots, or members that form a criss-cross pattern.

Figure 4:
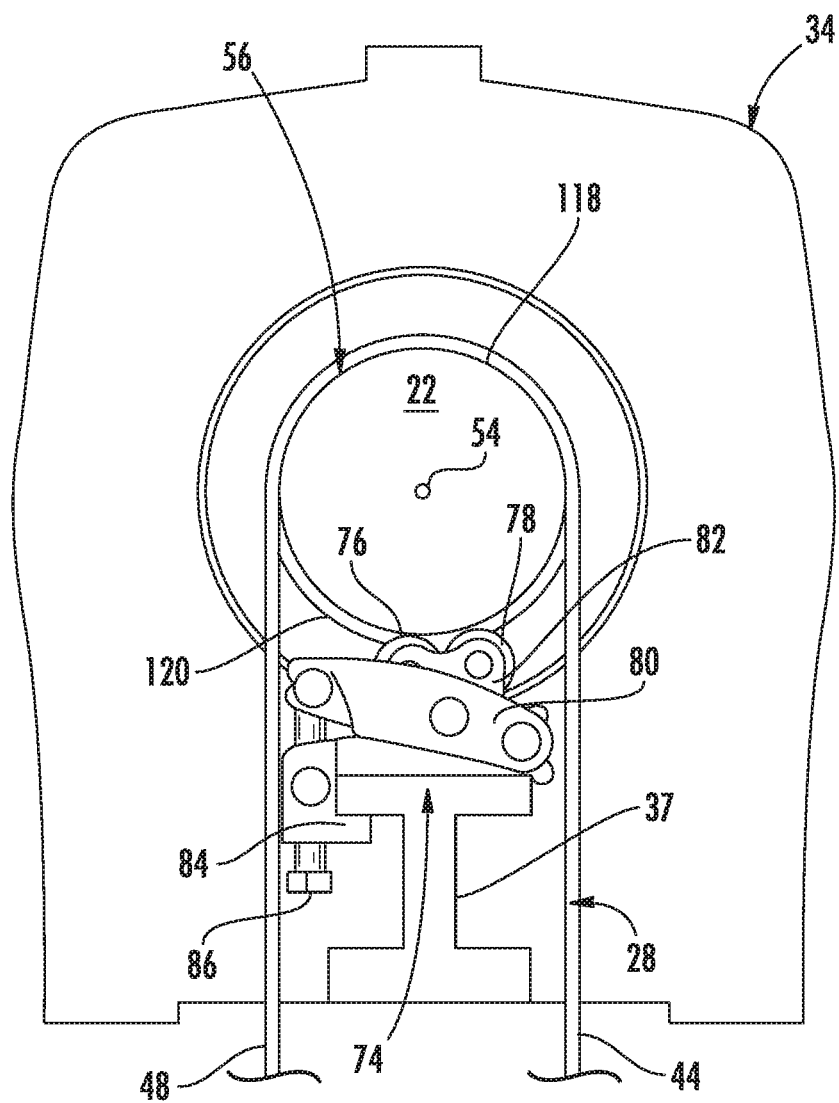
FIG. 4 is an end view of the sheave installed in the field and with a sheave knurling tool positioned upon the sheave.

Referring to FIG. 4, a sheave knurling tool 74 may be applied as part of a method to, for example, recondition a drive sheave 22 in the field without having to perform the time consuming and costly task of removing the belt 28. The sheave knurling tool 74 may include a plurality of knurling wheels (i.e., two illustrated as 76, 78), an arm 80, a carrier 82, a body 84 and a jack 86. The body 84 is adapted to fixedly and detachably mount to the support structure 37 of the drive unit 34 generally between the two segments 44, 48 of the belt 28 that may drape down from the drive sheave 22. In the present example, the body 84 may rest upon a shelf 88 (see FIG. 5) of the support structure 37. It is further contemplated and understood that the body 84 may be fixed to the support structure 37 in any variety of ways and may be dependent upon the physical orientation of the support structure for a particular application. In another example, the body 84 maybe bolted to the support structure by utilizing pre-existing bolts of the structure.

Figure 5:
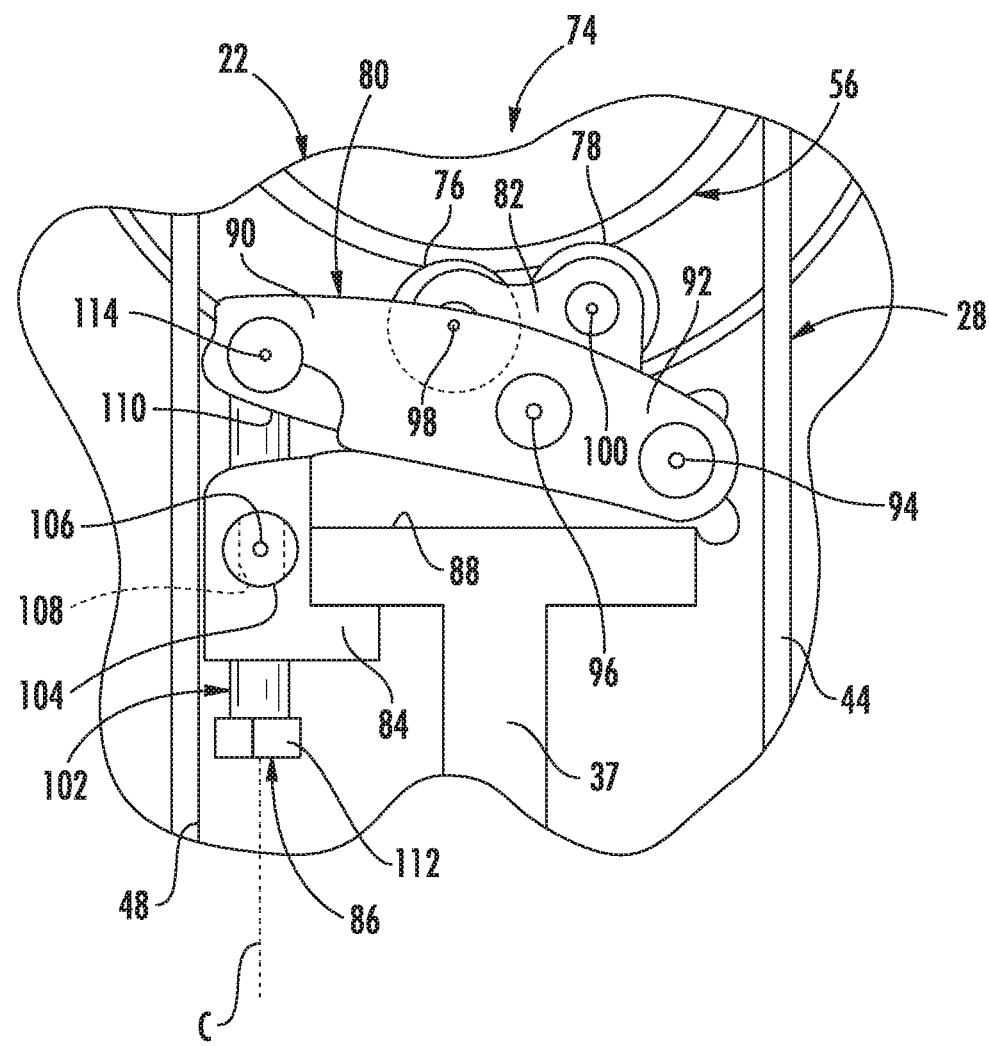
FIG. 5 is an enlarged view of the sheave knurling tool.

Referring to FIGS. 4 and 5, the arm 80 may include opposite end portions 90, 92, with the first end portion 90 being in operative contact with the jack 86, and the second end portion 92 being pivotally engaged to the body 84 about a pivot axis 94. The carrier 82 may be pivotally engaged to the arm 80 about a pivot axis 96 that may be disposed between the end portions 90, 92 of the arm. The knurling wheels 76, 78 may be rotationally engaged to the carrier 82 about respective rotational axis 98, 100 spaced radially apart from one another.

The jack 86 may include a screw 102 that extends along a centerline C, and a rod or pin 104 rotationally mounted to the body 84 about axis 106. A threaded bore 108 may communicate transversely through the pin 104 for adjustable and threaded engagement of the screw 102. The screw 102 may include including opposite first and second end segments 110, 112, with the first end segment 110 being in operative contact (i.e., bearing against) the first end portion 90 of the arm, and the second end segment 112 being an enlarged head such as, for example, a bolt head to facilitate rotational adjustment of the screw 102. The operative contact of the first end segment 110 may generally be a pivotal engagement about a pivot axis 114. The centerline C may be about normal to and extends through the axis 106. The axes 94, 96, 98, 100, 106, 114 may all be substantially parallel to one-another.

Figure 6:
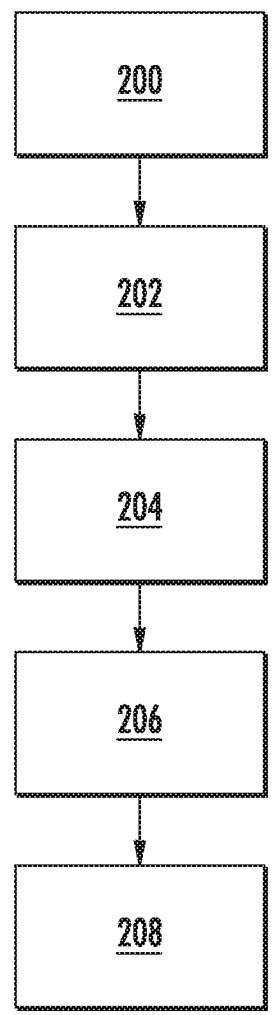
FIG. 6 is a flow chart of a method of imprinting the sheave.

Referring to FIGS. 5 and 6, a method of imprinting a sheave 22 and/or operating the sheave knurling tool 74 is generally illustrated as one, non-limiting, example. The method may be applied as a repair method that utilizes a knurling process to press the plurality of imprints 52 into the surface 56 (i.e., plastically deform the surface). During the knurling process, the drive sheave 22 may remain coupled to the drive unit 34 (i.e., in the field) and the belt 28 may remain in contact with a circumferentially extending section 118 (see FIG. 4) of the cylindrical surface 56.

At block 200 of FIG. 6, the sheave knurling tool 74 may be placed between the two belt segments 44, 48 and generally beneath the drive sheave 22. At block 202, the body 84 of the sheave knurling tool 74 may be mounted to the support structure 37 of the drive unit 34. At block 204, the jack 86 may be actuated thereby pivotally moving the arm 80 with respect to the body 84 and about axis 94. With the pivoting motion of the arm, the screw 102 may pivot with respect to the arm 80 about axis 114, and pivot with respect to the body 84 about axis 106. At block 206 and with continued actuation of the jack 86, the knurling wheels 76, 78 may be biased against a circumferentially extending, exposed, section 120 of the cylindrical surface 56 (i.e., that section of the surface not in contact with the belt 28). The pivoting action of the carrier 82 with respect to the arm 80 and about axis 96 assists in establishing an even distribution of a bearing/bias force between the wheels 76, 78. The magnitude of this biasing force is sufficient to cause plastic deformation of the surface 56. At block 208 the drive sheave 22 is rotated about axis 54 thereby rotating the knurling wheels 76, 78 which produces the plurality of imprints 52 (see FIG. 3). The drive sheave 22 may be rotated via the drive unit 34 that remains coupled to the sheave, or by other means.

Figure 7:
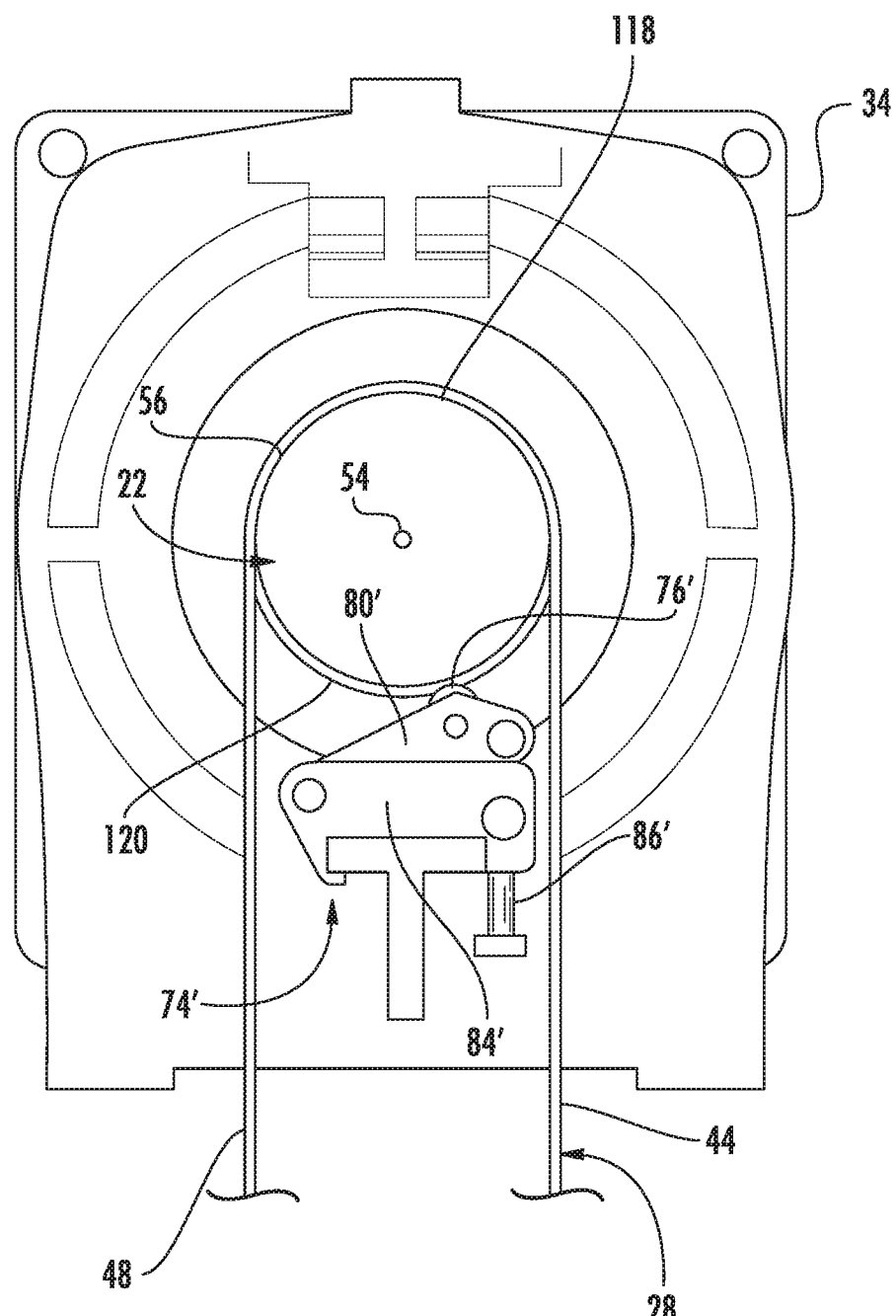
FIG. 7 is an end view of a second embodiment of a sheave knurling tool position upon the sheave.

Referring to FIG. 7, a second embodiment of a sheave knurling tool is illustrated wherein like elements to the first embodiment have like identifying numerals except with the addition of a prime symbol suffix. A sheave knurling tool 74' may include a single knurling wheel 76' mounted for rotation directly to an arm 80'. In this example, the carrier 82 of the first embodiment may not be utilized.

Advantages and benefits of the present disclosure include a sheave with reduced belt slip, and a tool providing the ability to perform maintenance on a sheave without having to remove the sheave from the field. Other advantages include a solution to driven sheaves of an elevator system that may have surfaces undesirably polished by prior belt slip occurrences, a reduction in maintenance costs, and a reduction in system downtime.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A sheave knurling tool adapted to knurl a sheave while carrying a belt and while coupled to a drive unit for rotation, the sheave knurling tool comprising:
    a body adapted to detachably couple to a support structure of the drive unit;
    an arm pivotally engaged to the body about a first pivot axis;
    a jack adjustably coupled to and extending between the body and the arm; and
    a first knurling wheel carried by and rotationally engaged to the arm about a rotational axis disposed parallel to the first pivot axis, and wherein the jack is constructed and arranged to pivot the arm toward the sheave thereby exerting a biasing force of the first knurling wheel against the sheave, wherein the jack is pivotally engaged to the arm at a second pivot axis.

2. The sheave knurling tool set forth in claim 1, wherein the jack is pivotally coupled to the body at a third pivot axis.

3. The sheave knurling tool set forth in claim 2, wherein the jack includes a rod mounted for rotation to the body, and a threaded bore in the rod threadably receives a screw of the jack.

4. The sheave knurling tool set forth in claim 2, wherein the first knurling wheel is carried by the arm between the first and second pivot axis.

5. A sheave knurling tool adapted to knurl a sheave while carrying a belt and while coupled to a drive unit for rotation, the sheave knurling tool comprising:
    a body adapted to detachably couple to a support structure of the drive unit;
    an arm pivotally engaged to the body about a first pivot axis;
    a jack adjustably coupled to and extending between the body and the arm;
    a first knurling wheel carried by the arm, and wherein the jack is constructed and arranged to pivot the arm toward the sheave thereby exerting a biasing force of the first knurling wheel against the sheave, the jack is pivotally engaged to the arm at a second pivot axis, and the jack is pivotally coupled to the body at a third pivot axis;
    a carrier pivotally engaged to the arm about a fourth pivot axis; and
    a second knurling wheel rotationally engaged to the carrier about a second rotational axis, and wherein the first knurling wheel is rotationally engaged to the carrier about a first rotational axis spaced radially from the second rotational axis.

6. The sheave knurling tool set forth in claim 5, wherein the first, second, third, and fourth pivot axes are substantially parallel to one-another.

7. A sheave knurling tool adapted to knurl a sheave while carrying a belt and while coupled to a drive unit for rotation, the sheave knurling tool comprising:
    a body adapted to detachably couple to a support structure of the drive unit;
    an arm pivotally engaged to the body about a first pivot axis;
    a jack adjustably coupled to and extending between the body and the arm; and
    a first knurling wheel carried by the arm, and wherein the jack is constructed and arranged to pivot the arm toward the sheave thereby exerting a biasing force of the first knurling wheel against the sheave, wherein the jack includes a rod mounted for rotation to the body and a threaded bore in the rod threadably receives a screw of the jack.

8. The sheave knurling tool set forth in claim 7, wherein an end segment of the screw is operatively coupled to a first end portion of the arm, and the first pivot axis is located at an opposite second end portion of the arm.

9. The sheave knurling tool set forth in claim 8, wherein the first knurling wheel is rotationally engage to the arm between the first and second end portions.

10. The sheave knurling tool set forth in claim 8 further comprising:
- a carrier pivotally engaged to the arm between the first and second end portions; and
- a second knurling wheel rotationally engaged to the carrier, and wherein the first knurling wheel is rotationally engaged to the carrier.

* * * * *